UNITED STATES PATENT OFFICE.

WALTER O'HARA, OF FALL RIVER, MASSACHUSETTS.

IMPROVEMENT IN COVERINGS FOR BOILERS, PIPES, &c.

Specification forming part of Letters Patent No. 159,206, dated January 26, 1875; application filed December 5, 1874.

*To all whom it may concern:*

Be it known that I, WALTER O'HARA, of Fall River, in the county of Bristol and State of Massachusetts, have invented certain new and useful Improvements in Non-Conducting Covering for Steam-Boilers, Pipes, &c.; and I do hereby declare that the following is a full, clear, and exact description thereof, reference being had to the accompanying drawings, and to the letters of reference marked thereon, which form a part of this specification.

The nature of my invention consists in the mode of preparing canvas or bagging with a silicate and ashes, for the purpose of covering the exterior parts of steam-boilers, steam and hot-air pipes, and other surfaces upon which a non-conducting and fire-proof covering is desirable.

The mode of preparing the canvas or bagging is as follows: A layer or stratum of suitable thickness of plastic, formed of silicate of soda, or other silicate, and ashes, is spread over said canvas or bagging, the said canvas or bagging being previously saturated with silicate of soda or water-glass. The canvas or bagging thus prepared is adjusted with the coated side next to the surface to which it is applied. The outside of the canvas or bagging is then enveloped with a sheathing of fine canvas or cotton cloth, also saturated with silicate of soda, or other silicate. The said sheathing is held in position by the adhesive nature of the silicate, which firmly unites together the seams, and dispenses with the operation of sewing. The sheathing also gives the covering a smooth and even surface for the application of paint or other coloring matter.

Having thus fully described my invention, what I claim as new, and desire to secure by Letters Patent, is—

A non-conducting covering for boilers and steam-pipe, consisting of a layer of plastic compound—of ashes and silicate of soda—spread upon canvas or other suitable fabric, which has previously been treated with silicate of soda or water-glass, substantially as herein set forth.

In testimony that I claim the foregoing as my own invention I affix my signature in presence of two witnesses.

WALTER O'HARA.

Witnesses:
C. M. O'HARA,
B. F. WINSLOW.